(12) United States Patent
Dworkin et al.

(10) Patent No.: US 6,199,086 B1
(45) Date of Patent: Mar. 6, 2001

(54) CIRCUIT AND METHOD FOR DECOMPRESSING COMPRESSED ELLIPTIC CURVE POINTS

(75) Inventors: James Douglas Dworkin; Michael John Torla, both of Chandler; P. Michael Glaser, Tempe, all of AZ (US); Ashok Vadekar, Mississauga (CA); Robert John Lambert, Hespeler (CA); Scott Alexander Vanstone, Waterloo (CA)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/997,959

(22) Filed: Dec. 24, 1997

(51) Int. Cl.[7] ............................... G06F 7/72; H04L 9/28
(52) U.S. Cl. ............................... 708/492; 380/28
(58) Field of Search .................... 708/492, 491; 380/28, 30

(56) References Cited

U.S. PATENT DOCUMENTS 5,077,793 * 12/1991 Falk et al. ........................ 708/491
5,313,530 * 5/1994 Iwamura .......................... 708/491
5,497,423 * 3/1996 Miyaji .............................. 380/28
5,627,893 * 5/1997 Demytko .......................... 380/30
5,737,424 * 4/1998 Elteto et al. ...................... 380/28

* cited by examiner

*Primary Examiner*—David H. Malzahn
(74) *Attorney, Agent, or Firm*—Randi L. Dulaney

(57) ABSTRACT

An elliptic curve (EC) processor circuit (120) comprising a finite field arithmetic logic unit (122), operation registers (124) an EC control unit (123) and a register file (127). A storage element (250) is coupled to the finite field arithmetic logic unit (122). The EC control unit (123) controls the various components of the EC processor circuit (120) to decompress a compressed one-bit representation of a Y coordinate of an elliptic curve point (X, Y). The EC control unit (123) controls the use of the operation register (124), the storage element (250) and the finite field arithmetic logic unit (122) to recursively compute the decompressed version of the compressed Y coordinate based upon the X coordinate and the compressed one-bit representation of the Y coordinate. The circuit and method employ minimal additional hardware and processing in an EC processor circuit (120).

16 Claims, 4 Drawing Sheets

CIRCUIT AND METHOD FOR DECOMPRESSING COMPRESSED ELLIPTIC CURVE POINTS

FIELD OF THE INVENTION

The present invention is directed to wireless communication technology where secure communication is achieved using elliptic curve cryptographic techniques, and more particularly to a circuit and method for decompressing a compressed elliptic curve point for further processing.

BACKGROUND OF THE INVENTION

The use of secure communication of information provided by encryption techniques is desirable in wireless communication devices, such as pagers, cellular telephones, etc. In these environments, there is a constant struggle to minimize the amount of information transmitted to control costs and profitability of systems. When the data to be transmitted is encrypted, it is still desirable to minimize the overall amount of data actually transmitted.

Elliptic curve (EC) cryptography has become particularly useful in the field of wireless communication because it is more efficient both in terms of bandwidth and computation time than other industry public key encryption standards, such as RSA. It is desirable to provide a circuit and method for exploiting certain properties of EC cryptography to facilitate the use of this technology in wireless communication devices.

DESCRIPTION OF A PREFERRED EMBODIMENT

Figure 1:
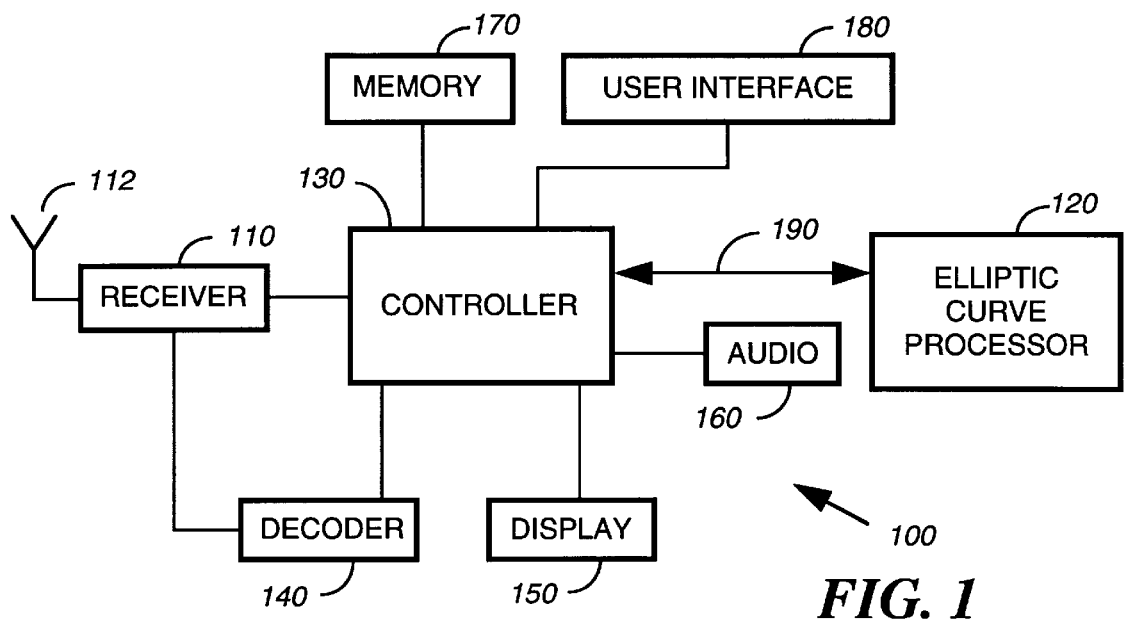
FIG. 1 is a block diagram of a communication device suitable for receiving and processing elliptic curve points transmitted wirelessly from a remote device in accordance with the present invention.

FIG. 1 illustrates a communication device 100 comprising a receiver 110, an elliptic curve (EC) processor 120, a controller 130 and associated peripherals to the controller 130. Information transmitted by way of radio frequency (RF) signals are detected by the antenna 112 and received by the receiver 110. In the case where the communication device is a selective call receiver (pager), the information is processed by a decoder 140 in accordance with protocol rules and definitions, such as those set by the FLEX™ paging protocol developed by Motorola, Inc. The controller 130 processes the received and decoded information for display on a display device 150 or playback of voice on an audio output device 160. The controller 130 accesses information in memory 170 to, for example, compare a received paging address with a stored address. Received message information is also stored in the memory 170. User access and control of the communication device is by way of user interface 180. The controller 130 exchanges information with the EC processor 130 via a host bus 190.

The receiver 110 is a radio frequency (RF) receiver for example. The controller 130 is embodied by a microprocessor, for example, and processes information extracted from the received signal. The controller 130 may also perform the functions of the decoder 140. The controller 130 is the point of control for the communication device 100. It stores received information in memory 170, compares received information with stored information (such as paging addresses), receives user input from the user interface 180 and displays information on the display 150. The elliptic curve processor 120 is preferably embodied as an application specific integrated circuit (ASIC) or "chip set" which is adapted to be incorporated into communication devices, such as the one shown in FIG. 1. In some applications, it is desirable that the elliptic curve processor 120 and the controller 130 be integrated into one integrated circuit.

Figure 2:
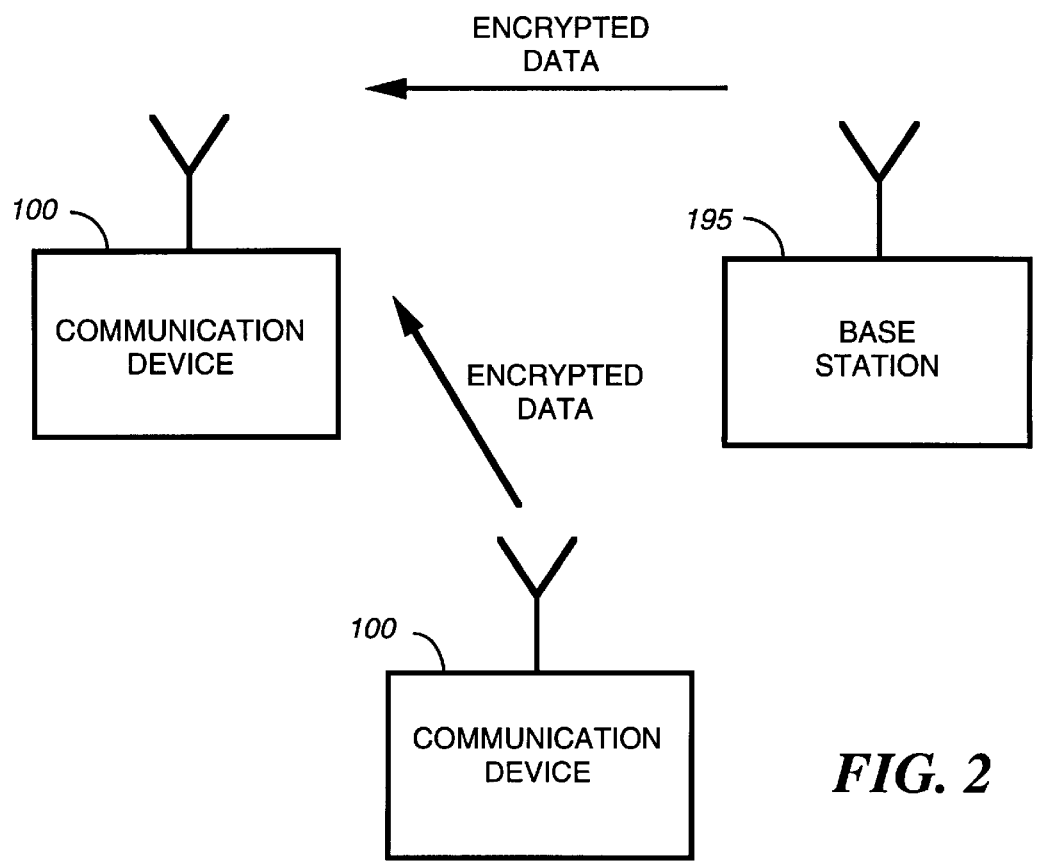
FIG. 2 is a block diagram of a communication system in which secure communication is desired.

As shown in FIG. 2, the communication device 100 is used in a communication system to communicate with a base station 195 (such as a paging or cellular base station) or with another communication device 100. Encrypted data or messages may be transmitted from the base station 195 to the communication device 100 or in the opposite direction as well. The data which is encrypted prior to transmission may be alphanumeric text, graphics, financial data, voice, etc.

Figure 3:
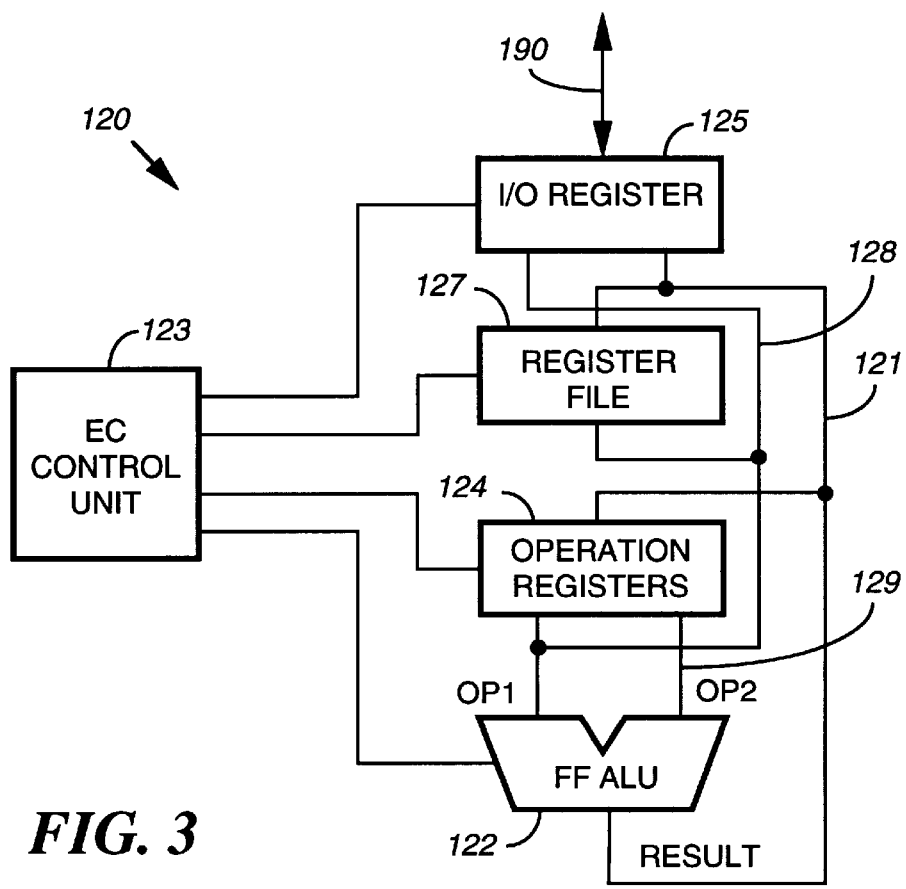
FIG. 3 is a block diagram of an elliptic curve processor useful in processing elliptic curve points according to the present invention.
Figure 4:
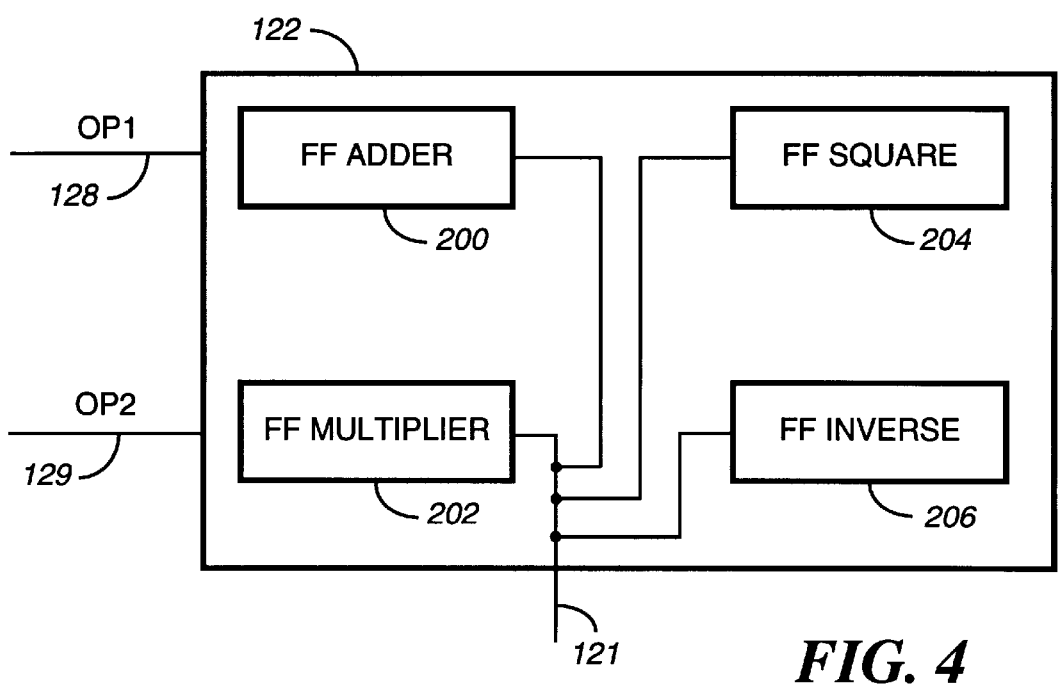
FIG. 4 is block diagram of a finite field arithmetic logic unit of the elliptic curve processor shown in FIG. 3.

Turning now to FIGS. 3 and 4, the EC processor 120 is shown in greater detail. The EC processor 120 is a hardware circuit that processes EC points embedded in the received information in order to generate the data or message. The EC processor 120 comprises a finite field (FF) arithmetic logic unit (ALU) 122, an EC control unit 123, operation registers 124, input/output (I/O) register 125, and a register file 127. The finite field ALU 122 has inputs for receiving first and second operands from a first operations bus 128 and a second operations bus 129, respectively. The result of a finite field operation is returned on the result bus 121. Data to be processed by the EC processor 120 is received via the I/O register 125 and processed data is returned via the I/O register 125. The operation buses 128 and 129 and the result bus 121 are of the same bit width as the bit computation capability of the FF ALU 122. For example, the FF ALU 122 has 246 bit processing capability. The EC control unit 123 is a control circuit which includes a read only memory (ROM) that stores instructions for controlling the operation of the EC processor 120.

As is well known in the art, processing of elliptic curve points involves the use of one or more finite field operations. The EC processor 120 coordinates these operations with the finite field ALU 122. These operations are performed by the circuits shown in FIG. 4, including a FF adder circuit 200, FF multiplier circuit 202, FF square circuit 204 and FF inverse circuit 206. The FF ALU 122 is provided with additional circuitry to efficiently decompress compressed elliptic curve points. The EC processor 120 processes EC points to generate decrypted data and returns the decrypted data to the controller 130. In addition, the EC processor 120 decompresses (or unpacks) a compressed EC point, and returns it to the controller 130 for further processing. It also receives a decompressed and pre-processed EC point from the controller 130 for processing in order to generate the decrypted data for return to the controller 130.

The EC point represents encrypted or "signed" data, such as financial data, text data, graphics data, voice, etc. Each EC point is therefore an important element, albeit encrypted, of the data.

The present invention is related to configuring particular components of the EC processor 120 in order to decompress a compressed EC point.

Figure 5:
FIG. 5 is a graphical diagram showing the transmission of data representing an elliptic curve point in an uncompressed format.
Figure 6:
FIG. 6 is a graphical diagram showing the transmission of data representing an elliptic curve point in a compressed format.

Briefly, an EC point P=(X,Y) is a point on the elliptic curve E: $y^2+xy=x^3+ax^2+b$, defined over a field $F_2m$ (a finite field containing $2^m$ distinct elements). The parameter b of the elliptic curve E is represented by $b=b_0b_1 \ldots b_{m-2}b_{m-1}$ where $b_{m-1}$ is the most significant bit position and $b_0$ is the least significant bit position. A similar parameter a exists. The packed or compressed EC point is (X, Y'), where Y' is a compressed single bit representation of the Y coordinate. FIG. 5 shows an EC point comprising a pair of finite field elements (X,Y), each comprised of m bits. Transmitting an EC point consequently involves transmitting $2_m$ bits. However, owing to a property of EC, the knowledge of the X coordinate allows the computation of the Y coordinate. More specifically, in an EC system, there are only 2 Y coordinates for each X coordinate. Therefore, as shown in FIG. 6, a single bit of the Y coordinate of an EC point is sufficient information to compute the entire Y coordinate if the X coordinate is known. Thus, an EC point can be compressed or packed by reducing the Y coordinate to 1 bit at the transmission end, to allow for selection of one of the two possible Y coordinates from knowledge of the X-coordinate. As an example, each X and Y coordinate of an EC point is represented by 160 bits. Thus, a compressed EC point can be represented by 161 bits in a packed or compressed form, instead of 320 bits. The one exception to this general rule is when X is the null set (all zero's) and is referred to in this case as the "point at infinity". In this degenerate case, there is only one corresponding Y coordinate.

This ability to compress or pack the data representing an EC point is a known property of EC cryptography. The present invention is directed to a specific circuit and method for unpacking or decompressing compressed binary information in the elliptic curve (finite field) mathematical representation. The following circuit and method operate for elliptic curve systems using a normal basis representation.

According to the present invention, a field element α is defined, where $\alpha=X+a+bX^{-2}$, and where $X^{-2}$ is a computed using a finite field square and a finite field inverse operation in the finite field $F_2m$. The field element α is a first plurality of bits which has a vector representation $\alpha=\alpha_0, \alpha_1 \ldots \alpha_{m-2}\alpha_{m-1}$. Another field element Z is defined, which is a first plurality of bits having a vector representation $z_0 z_1 \ldots z_{m-2}z_{m-1}$. Ultimately, Y is computed by the finite field multiplication of the binary information representing X and Z. The goal is to compute Z from α given the equation $Z^2+Z=\alpha$, and given $z_{m-1}=Y'$. For example, let m=15, then in a normal basis representation:

$$Z=z_{14}z_{13}z_{12}z_{11}z_{10}z_9z_8z_7z_6z_5z_4z_3z_2z_1z_0;$$

$$Z^2=z_{13}z_{12}z_{11}z_{10}z_9z_8z_7z_6z_5z_4z_3z_2z_1z_0z_{14};$$

and $$\alpha=\alpha_{14}\alpha_{13}\alpha_{12}\alpha_{11}\alpha_{10}\alpha_9\alpha_8\alpha_7\alpha_6\alpha_5\alpha_4\alpha_3\alpha_2\alpha_1\alpha_0.$$

From these equations, it is seen that there are two solutions for Z. There is an "up" solution where the iterative solution follows the bit path used by squaring, that is, solving $Z^2+Z=\alpha$, for the Z terms, and a "down" solution produced by solving for the $Z^2$ terms. The present invention uses the "down" solution.

The FF ALU 122 employs the various circuits to perform operations on the binary information representing the finite field elements. In particular, the FF adder circuit 200 is used to perform an exclusive-OR operation. The FF square circuit is used to for the squaring operation and the square root operation. Squaring is a bit rotation from least significant bit (LSB) to most significant bit (MSB). In the normal basis representation of a finite field element, each bit is a place holder (a coefficient) of a polynomial. To square a plurality of bits representing a finite field element, the bits are rotated left by one bit position, such that the most significant bit cycles down to the least significant bit (this is a property of the mathematics of the field). The square root operation is a bit rotation from MSB to LSB, a rotation in the opposite direction of that for squaring. Therefore, the same FF square circuit block that rotates the bits in one direction to do squaring can also do a square root operation simply by rotating the bits in the opposite direction.

Figure 7:
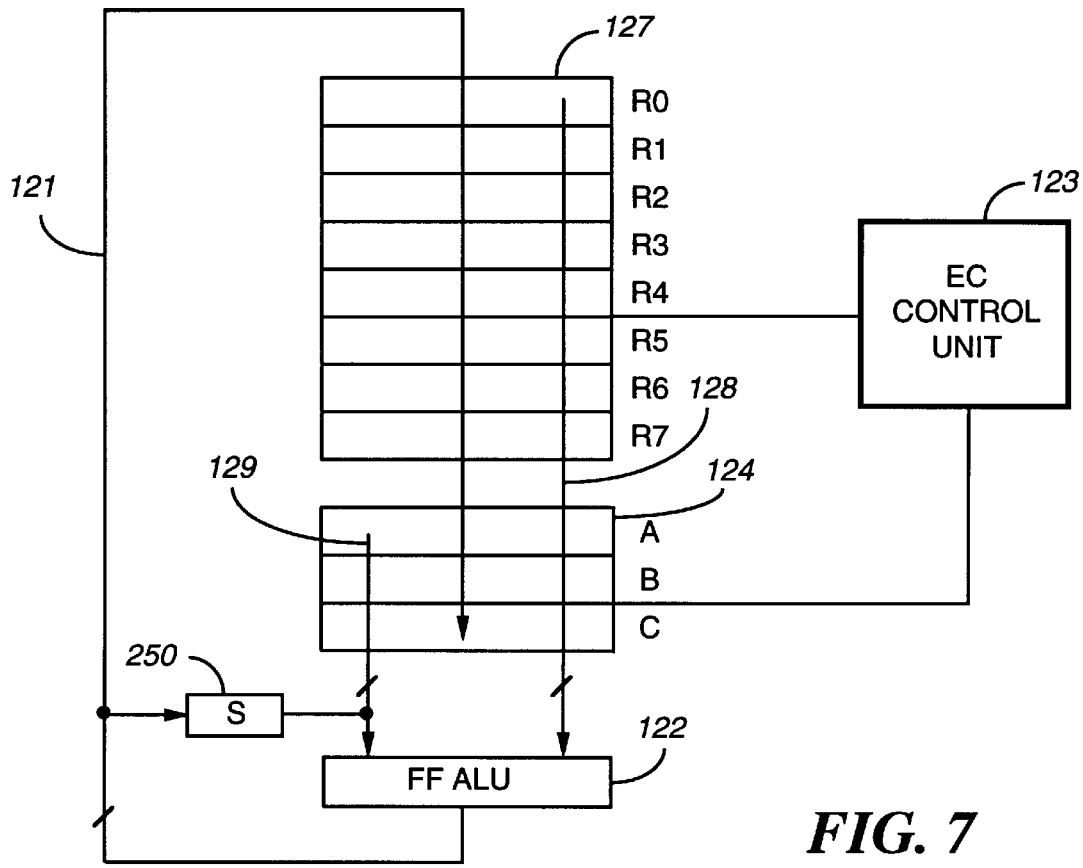
FIG. 7 is a block diagram of a portion of an elliptic curve processing circuit specifically configured with point decompression capability in accordance with the present invention.

Turning now to FIG. 7, a portion of the EC processor 120 is shown in greater detail. Specifically, the register file 127 is shown comprising registers R0 through R7 and the operation registers 124 comprising three operation registers A, B and C. The various FF ALU circuits are used in decompressing a compressed EC curve point. The FF adder circuit 200 is used to perform an exclusive-OR operation and the FF inverse circuit 206 is used to generate α. In accordance with the present invention, the FF square circuit 204 is used to rotate the bits of the C register although it also has utility for squaring a finite field element. The result of the FF operations is returned on the result bus 121 back to any of the operation registers. In addition, a one-bit storage element (S) 250, such as a D-type flip-flop, is provided and connected to the operations bus 129 as well as to the result bus 121.

Figure 8:
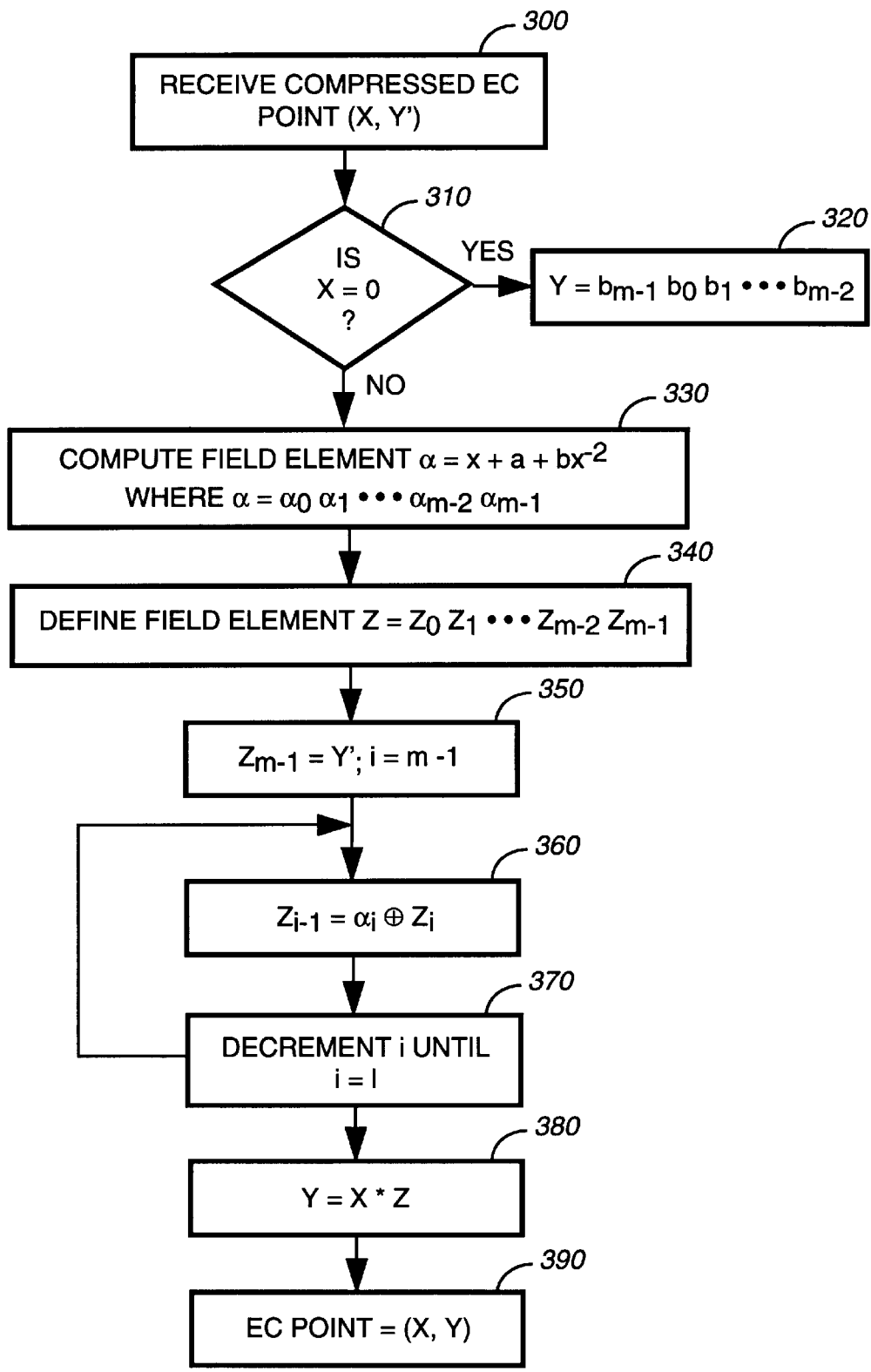
FIG. 8 is a block diagram of a method for decompressing the compressed elliptic curve point according to the present invention.

Turning to FIG. 8, the operation of the elliptic curve processor circuit to decompress a compressed EC point will be described. The methodology surrounding the invention involves executing a recursive operation. The knowledge of one bit of Z (which is Y') allows for the computation of the remaining bits of Z, which in turn allows for determination of the plurality of bits which represent the decompressed Y coordinate.

A compressed EC point (X, Y') is received by the EC processor 120 in step 300. The plurality of bits representing the X coordinate are loaded into one of the operation registers, such as register A. In step 310, the contents of register A is examined to determine whether the plurality of bits is all zeros, and if so, then in step 320, the Y coordinate is computed from the b parameter of the elliptic curve, which is determined by setting X=0 in the equation above and solving for Y=SQRT(b) using the FF square circuit 204. If the X coordinate is not all zeros, then the α is defined in step 330. More specifically, the plurality of bits representing the X coordinate in register A is coupled to the FF ALU 122 in order to compute the first plurality of bits representing the α vector according to the equation noted above using the FF inverse circuit 206 and FF multiplier circuit 202 of the FF ALU 122. The first plurality of bits representing the α vector are loaded initially in the C register. A finite field element Z is defined in step 340 and the C register is used to accumulate a second plurality of bits representing the Z vector as they are computed, replacing the α bits initially stored therein. The computation of Z begins in step 350, where the most significant bit of Z, $z_{m-1}$ is set to the one bit value of Y'. That is, Y' is loaded into the storage element 250 and is also loaded into the least significant bit of the C register. Next, in step 360, a subsequent lesser significant element of Z is computed by the exclusive-OR operation (performed by the FF adder 200) of the most significant bit of the C register, $C_{m-1}$, which is the element $\alpha_{m-1}$, and the current value of the storage element 250. This involves coupling to the FF ALU 122 a current value of the storage element 250 and a current most significant bit of the C register. The FF adder 200 in the FF ALU 122 adds these bits together and the result is returned on the result bus 121 and also stored in the storage element 250. The contents of the C register is then again coupled to the FF ALU 122 where the bits in the C register are rotated by the FF square circuit 204 to reposition the proper bit of the α vector to the most significant position of the C register and to make room for the newly computed element of the Z vector, which is loaded in the least significant bit position of C. In step 370, the index i is decremented by one and step 360 is performed again. Step 360 is performed to determine each bit of the Z vector until the least significant bit $z_0$ is determined, such that the entire Z vector resides in the C register. Finally, in step 380, the contents of the A register and the contents of the C register are coupled to the FF ALU 122 to compute the decompressed Y coordinate by performing the finite field multiplication of the plurality of bits representing the X coordinate and the second plurality of bits representing the Z vector (now contained in the C register), the product result of which is a third plurality of bits returned by the FF ALU 122 to the C register. The unpacked or decompressed EC point is then known in step 390 as (X, Y). The EC point (X, Y) can be returned to the controller 130 for further processing, or processed further by the EC processor 120.

The following is an example using a four bit field, where $\alpha=\alpha_3\alpha_2\alpha_1\alpha_0$ computed on the basis of the X coordinate, where $X=x_3x_2x_1x_0$ and the parameters a and b associated with the elliptic curve. The C register is loaded with the first plurality of bits $\alpha_3\alpha_2\alpha_1\alpha_0$.

Next, the most significant bit of Z ($z_3z_2z_1z_0$), $z_3$ is Y' and the C register is then changed to $\alpha_3\alpha_2\alpha 1 z3$; z3 is stored in storage element 250.

The recursive process computes the remaining lesser significant bits of Z. Specifically, $z_2$ is computed by the FF ALU 122 by adding the most significant bit of the C register, $\alpha_3$, to the value of the current value of the storage element 250, $z_3$. The C register is then shifted or rotated to the left by the FF square circuit 204 to make room for $z_2$ which is stored in the least significant bit position of the C register after the rotation such that the C register contains $\alpha_2\alpha_1z_3z_2$ and the storage element 250 is updated to store $z_2$. Again, $z_1$ is computed by adding the most significant bit of the C register, $\alpha_2$, to the current value of the storage element 250, $z_2$. The C register is again shifted to the left to make room for $z_1$ such that the C register contains $\alpha_1z_3z_2z_1$. The storage element 250 is updated to store $z_1$. The last recursive operation is performed to compute $z_0$ by adding the most significant bit of the C register, $\alpha_1$, to the current value of the storage element 250, $z_1$. The C register is once again shifted to the left and $z_0$ is stored in the least significant bit of the C register such that the C register contains $z_3z_2z_1z_0$. The storage element 250 contains $z_0$ at this point. Thus, in summary, the lesser significant bits of the second plurality of bits representing the Z vector are determined by adding a bit of the Z vector to a corresponding bit of the α vector. The decompressed Y coordinate is then computed by multiplying the contents of the C register with the contents of A register which stores the X coordinate.

The present invention has a primary advantage of decompressing a compressed EC point with minimal additional hardware added to an EC processor circuit. Furthermore, it should be understood that the EC processor circuit may have utility in wired communication applications, such as computer to computer communications across a computer network, by modem, etc.

The above description is intended by way of example only and is not intended to limit the present invention in any way except as set forth in the following claims.

What is claimed is:

1. An elliptic curve processing circuit comprising:
   a finite field arithmetic logic unit comprising a finite field square circuit, a finite field inverse circuit, a finite field multiplier circuit, and a finite field adder circuit;
   first and second operation registers;
   a storage element; and
   a control unit coupled to the finite field arithmetic logic unit, to the storage element, and to the first and second operation registers, the control unit being programmed to configure the elliptic curve processing circuit to decompress binary information representing a compressed elliptic curve point by:
   (a) loading a plurality of bits representing a corresponding X coordinate into the first operation register;
   (b) coupling the contents of the first operation register to the finite field arithmetic logic unit to compute a first plurality of bits according to an elliptic curve equation and loading the first plurality of bits into the second operation register;
   (c) loading into the storage element and also into a least significant bit position of the second operation register a single bit which represents the compressed Y coordinate of a compressed elliptic curve point;
   (d) coupling the contents of the second operation register and the storage element to the finite field arithmetic logic unit to determine a second plurality of bits which replace the contents of the second operation register, wherein a most significant bit of the second plurality of bits is equal to the single bit representing the compressed Y coordinate; and
   (e) coupling the contents of the first operation register and the second operation register to the finite field arithmetic logic unit to multiply the second plurality of bits in the second operation register by the plurality of bits representing the X coordinate to generate a product which is a third plurality of bits representing a decompressed Y coordinate.

2. The elliptic curve processing circuit of claim 1, wherein the storage element is a one-bit storage element.

3. The elliptic curve processing circuit of claim 1, wherein the control unit is programmed to determine the second plurality of bits by:
   (d1) coupling to the finite field arithmetic logic unit a current value of the storage element and a current most significant bit of the second operation register which are added together, and a result of which is returned to the storage element as a new current value;
   (d2) coupling the contents of the second operation register to the finite field arithmetic unit for squaring the contents of the second operation register in order to rotate the contents thereof;

(d3) loading the result to the least significant bit position of the second operation register; and (d4) repeating (d1) through (d3) until all the bits of the second plurality of bits are determined.

4. The elliptic curve processing circuit of claim 3, and further comprising first and second operations buses which connect the first and second operation registers and the storage element to the finite field arithmetic logic unit and a result bus which connects results generated by the finite field arithmetic logic unit to the first and second operation registers and to the storage element.

5. The elliptic curve processing circuit of claim 1, wherein the control unit is programmed to compute the first plurality of bits by controlling the finite field multiplier circuit and finite field inverse circuit to operate on the contents of the first operation register.

6. A communication device comprising the elliptic curve processing circuit of claim 1.

7. The communication device of claim 6, and further comprising:
- a receiver for receiving RF signals;
- a controller coupled to the receiver; and
- the controller being coupled to the elliptic curve processing circuit to supply elliptic curve point information embedded in the RF signals for processing by the elliptic curve processing circuit.

8. A selective call receiver comprising the elliptic curve processing circuit of claim 1, and further comprising:
- a receiver for receiving RF signals;
- a controller coupled to the receiver;
- a decoder coupled to the receiver and to the controller, the decoder decoding information in the RF signals; and
- the controller being coupled to the elliptic curve processing circuit to supply elliptic curve point information embedded in the RF signals for processing by the elliptic curve processing circuit.

9. In combination, a finite field arithmetic logic unit comprising a finite field square circuit, a finite field inverse circuit, a finite field multiplier circuit, and a finite field adder circuit; first and second operation registers; a storage element; and a control unit coupled to the finite field arithmetic logic unit, to the storage element, and to the first and second operation registers, the control unit being programmed to:

(a) load a plurality of bits representing a corresponding X coordinate into the first operation register;

(b) couple the contents of the first operation register to the finite field arithmetic logic unit to compute a first plurality of bits according to an elliptic curve equation and loading the first plurality of bits into the second operation register;

(c) load a single bit which represents a compressed Y coordinate into the storage element and also into a least significant bit position of the second operation register;

(d) couple the contents of the second operation register and the storage element to the finite field arithmetic logic unit to determine a second plurality of bits which replace the contents of the second operation register, wherein a most significant bit of the second plurality of bits is equal to the one bit which represents the compressed Y coordinate; and (e) couple the contents of the first operation register and the second operation register to the finite field arithmetic logic unit to multiply the second plurality of bits in the second operation register by the plurality of bits representing the X coordinate to generate a product which is a third plurality of bits representing a decompressed Y coordinate.

10. An elliptic curve processing circuit comprising the combination of claim 9.

11. The combination of claim 9, wherein the control unit is further programmed to determine the second plurality of bits by:

(d1) coupling to the finite field arithmetic logic unit a current value of the storage element and a current most significant bit of the second operation register which are added together, and a result of which is returned to the storage element as a new current value;

(d2) coupling the contents of the second operation register to the finite field arithmetic unit for squaring the contents of the second operation register in order to rotate the contents thereof;

(d3) loading the result to the least significant bit position of the second operation register; and (d4) repeating (d1) through (d3) until all the bits of the second plurality of bits are determined.

12. The combination of claim 9, wherein the storage element is a one-bit storage element.

13. The combination of claim 9, and further comprising first and second operations buses which connect the first and second operation registers and the storage element to the finite field arithmetic logic unit and a result bus which connects results generated by the finite field arithmetic logic unit to the first and second operation registers and to the storage element.

14. The combination of claim 9, wherein the control unit is programmed to compute the first plurality of bits by controlling the finite field multiplier circuit and finite field inverse circuit to operate on the contents of the first operation register.

15. A method for decompressing a compressed elliptic curve point comprising:

receiving a compressed elliptic curve point comprising a single bit which represents a compressed Y coordinate and a plurality of bits representing a corresponding X coordinate;

computing a first plurality of bits according to an elliptic curve equation using the plurality of bits representing the X coordinate;

determining a second plurality of bits based on the first plurality of bits and the single bit representing the compressed Y coordinate, wherein a most significant bit of the second plurality of bits is equal to the single bit representing the compressed Y coordinate; and determining a decompressed Y coordinate by multiplying the plurality of bits representing the X coordinate by the second plurality of bits.

16. The method of claim 15, wherein the step of determining the second plurality of bits comprises computing lesser significant bits of the second plurality of bits by adding bits of the first plurality of bits with corresponding determined bits of the second plurality of bits.

* * * * *